United States Patent
Ripy et al.

(10) Patent No.: US 7,240,142 B2
(45) Date of Patent: Jul. 3, 2007

(54) MASTER ELECTRONICS CARD WITH AN ADAPTIVE BANDWIDTH CIRCUIT

(75) Inventors: Paul Brian Ripy, Laurens, SC (US); Shuo Huang, Novato, CA (US); Amar Mohammed Othman, Santa Rosa, CA (US); Christophe Pierre Leroy, Rohnert Park, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 152 days.

(21) Appl. No.: 10/959,584

(22) Filed: Oct. 6, 2004

(65) Prior Publication Data

US 2006/0075179 A1   Apr. 6, 2006

(51) Int. Cl.
*G06F 13/36* (2006.01)
(52) U.S. Cl. .................. 710/310; 710/309; 710/240
(58) Field of Classification Search ........ 710/240–244, 710/309–310, 124, 117
See application file for complete search history.

(56) References Cited

U.S. PATENT DOCUMENTS

| | | | |
|---|---|---|---|
| 4,704,628 A * | 11/1987 | Chen et al. | 348/400.1 |
| 5,872,936 A * | 2/1999 | Eckstein | 710/107 |
| 6,016,311 A | 1/2000 | Gilbert et al. | 370/280 |
| 6,118,791 A | 9/2000 | Fichou et al. | 370/468 |
| 6,138,200 A * | 10/2000 | Ogilvie | 710/244 |
| 6,252,877 B1 * | 6/2001 | Kozaki et al. | 370/399 |
| 6,973,509 B2 * | 12/2005 | McIntosh et al. | 710/15 |
| 2001/0008563 A1 * | 7/2001 | Yamaura et al. | 382/162 |

OTHER PUBLICATIONS

U.S. Appl. No. 10/738,283, filed Dec. 17, 2003, Ripy et al.

* cited by examiner

*Primary Examiner*—Mark H. Rinehart
*Assistant Examiner*—Kim T. Huynh
(74) *Attorney, Agent, or Firm*—Mark C. Pickering (57) ABSTRACT

The bus circuit of a master electronics card in a backplane-based communications system adaptively grants the upstream bus to the slave electronics cards by the early termination of a scheduled number of grants to a slave electronics card when the bus circuit on the master electronics card detects idle cells.

23 Claims, 5 Drawing Sheets

MASTER ELECTRONICS CARD WITH AN ADAPTIVE BANDWIDTH CIRCUIT

BACKGROUND OF THE INVENTION

1. Field of the Invention

The present invention relates to a master electronics card in a backplane-based communications system and, more particularly, to a master electronics card with an adaptive bandwidth circuit that substantially increases the throughput efficiency.

2. Description of the Related Art

A backplane-based communications system is a system that electrically connects together a number of electronics cards, such as xDSL line cards, via a multi-drop transmission line (MDTL) that runs through the backplane. Each of the electronics cards includes transceivers that receive information from, and transmit information to, the MDTL.

The electronics cards send information to, and receive information from, the MDTL in accordance with the rules defined by a communications protocol. One common communications protocol is the asynchronous transfer mode (ATM) protocol. The ATM protocol defines the rules for transferring data across a network in 53-byte cells that include a 48-byte data field and a 5-byte header.

Figure 1:
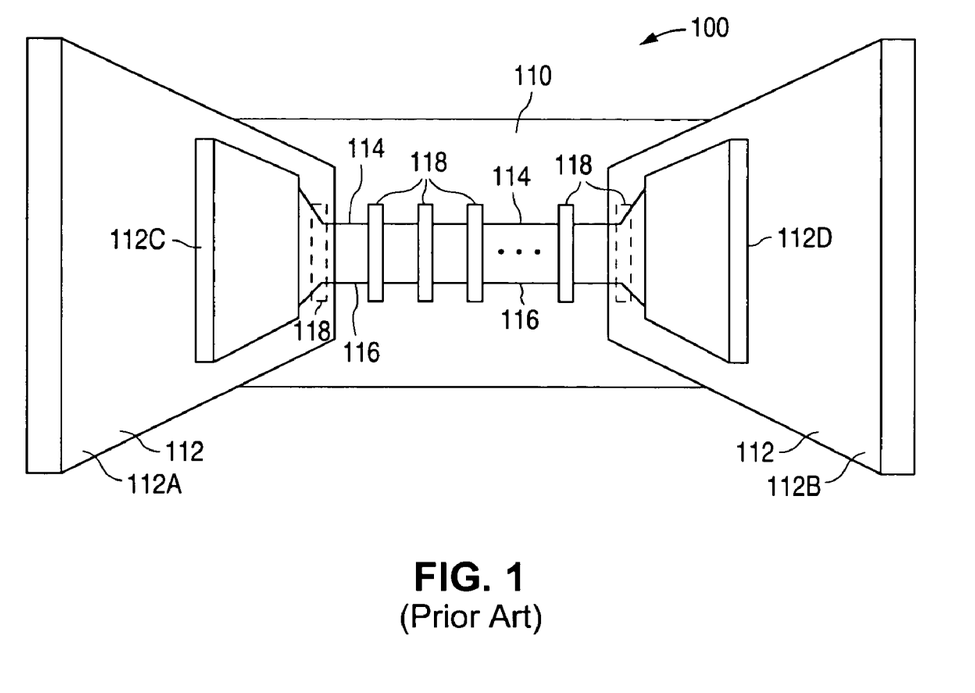
FIG. 1 is a perspective view illustrating a prior-art, backplane-based communications system 100.

FIG. 1 shows a perspective view that illustrates a prior-art, backplane-based communications system 100. As shown in FIG. 1, communications system 100 includes a backplane 110, and a number of electronics cards 112 that are plugged into backplane 110. The electronics cards 112, in turn, include a master electronics card 112A, and a number of slave electronics cards 112B. (Only one slave electronics card 112B is shown in FIG. 1 for the sake of clarity.)

Master electronics card 112A, in turn, includes a bus circuit 112C that generates master data and control signals, and receives slave data and control signals. Similarly, the slave electronics cards 112B include a bus circuit 112D that generates the slave data and control signals, and receives the master data and control signals.

Backplane 110 also includes a first MDTL 114 that has a number of metal lines, and a second MDTL 116 that has a number of metal lines. First MDTL 114 supports a downstream bus, while second MDTL supports an upstream bus. In addition, backplane 110 has a number of connecters 118 that are connected to the first and second MDTLs 114 and 116. The connecters 118 are uniformly distributed along the length of the first and second MDTLs 114 and 116 to have, for example, a 2.54 cm (one inch) spacing. As shown in FIG. 1, master electronics card 112A and the slave electronics cards 112B are plugged into the connecters 118.

Figure 2:
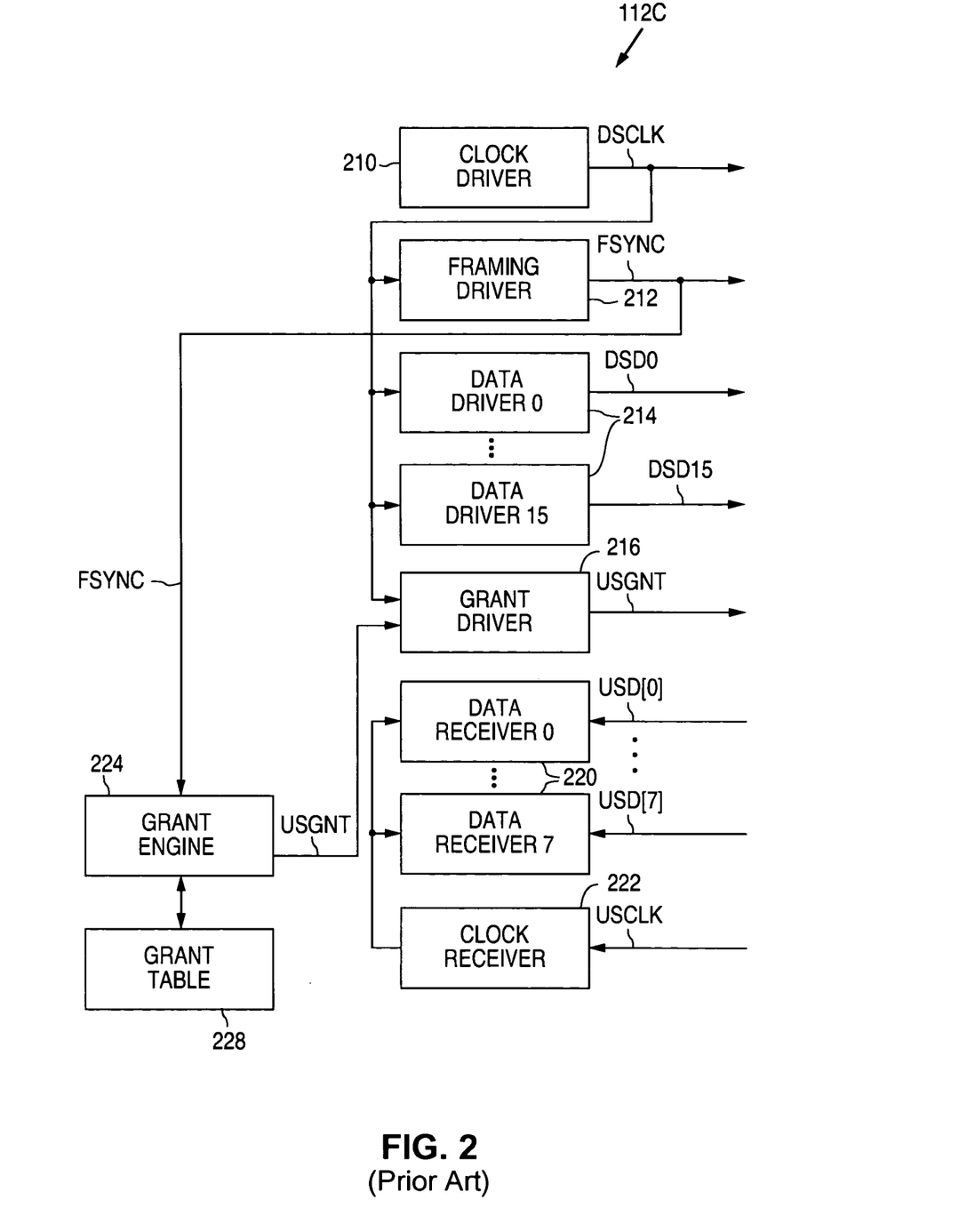
FIG. 2 is a block diagram illustrating bus circuit 112C of master electronics card 112A.

FIG. 2 shows a block diagram that illustrates bus circuit 112C of master electronics card 112A. As shown in FIG. 2, bus circuit 112C has a clock driver 210 that outputs a downstream clock signal DSCLK, and a framing driver 212 that outputs a framing signal FSYNC to the slave electronics cards 112B. The framing signal FSYNC has a series of framing pulses that are referenced to the downstream clock signal DSCLK.

As further shown in FIG. 2, bus circuit 112C of master electronics card 112A also includes 16 downstream data drivers 214 that output 16 downstream data signals DSD0-DSD15 to 16 corresponding slave electronics cards 112B such that each slave electronics card 112B receives a different downstream data signal DSD during each framing period.

Each data driver 214 serially outputs a downstream data signal DSD such that each byte of data has bits of data that are output during different periods of the downstream clock signal DSCLK. The data drivers 214 can be implemented as inverting backplane transceiver logic (BTL) drivers.

In addition, bus circuit 112C of master electronics card 112A also has a grant driver 216 that drives a bus grant signal USGNT to the slave electronics cards 112B during each framing period. The bus grant signal USGNT grants a slave electronics card 112B control over the upstream bus to transmit eight upstream data signals USD[7:0] during the next framing period.

FIGS. 3A-3F show timing diagrams that illustrate the operation of bus circuit 112C of master electronics card 112A. In addition, FIGS. 4A-4D show timing diagrams that further illustrate the operation of bus circuit 112C. As shown in the figures, clock driver 210 outputs the downstream clock signal DSCLK, which has a period T, while framing driver 212 outputs the framing signal FSYNC with a series of pulses. The series of pulses define a series of time slots where each pair of adjacent pulses defines a time slot.

In the present example, the downstream clock signal DSCLK is output with a frequency of 77.76 Mhz, and the framing signal FSYNC is output as a pulse that has a logic high that lasts for seven downstream clock periods, and a logic low that lasts for 212 downstream clock periods.

Further, each downstream data signal DSD has 424 bits of data (b'0-b'423) that are transmitted during the 212 downstream clock periods that the framing signal FSYNC is low. The 424 bits of data equal 53 eight-bit bytes which, in turn, is the required size of an ATM cell. As a result, each driver 214 outputs a data signal DSD between framing pulses that represents one ATM cell.

As shown in FIGS. 3A-3F, each data driver 214 outputs the first data bit b'0 of the 424 data bits following the rising edge of the downstream clock signal DSCLK that immediately precedes the falling edge of the framing signal FSYNC. As a result, the leading edge of first data bit b'0 slightly trails the rising edge of the clock signal DSCLK, but is substantially coincident with the falling edge of the framing signal FSYNC.

In addition, each data driver 214 outputs the second data bit b'1 following the next falling edge of the downstream clock signal DSCLK. This sequence continues until the last data bit b'423 of the 424 bits is output following the falling edge of the downstream clock signal DSCLK that immediately precedes the rising edge of the framing signal FSYNC.

As a result, the leading edge of last data bit b'423 slightly trails the falling edge of the clock signal DSCLK, while the trailing edge of the last data bit b'423 is substantially coincident with the rising edge of the framing signal FSYNC. The rising edge of the framing signal FSYNC indicates the end of one ATM cell, while the falling edge of the framing signal FSYNC indicates the beginning of the next ATM cell.

Thus, each driver 214 outputs a bit of data during each half period of the downstream clock signal DSCLK, following both the rising and falling edges of the clock signal DSCLK. As a result, since each driver 214 outputs two bits during each of the 424 clock periods, and data is transferred every 424 clock periods out of every 431 clock periods (no data is transferred during the seven clock periods that the framing signal FSYNC is high), each driver 214 has a serial data rate of approximately 152 Mbps.

Included within the 424 bits of data is a header error control (HEC) that detects errors in the header of the ATM cell. Each driver 214 computes the HEC for all of the to-be-transmitted ATM cells. The HEC is computed per the ATM protocol on the first four bytes of a cell, and is inserted as the fifth byte of the cell.

Returning to FIG. 2, bus circuit 112C of master electronics card 112A also has eight data receivers 220 that receive the eight upstream data signals USD[7:0] over the upstream bus from the slave electronics cards 112B. The data receivers 220 receive the upstream data signals USD[7:0] in parallel such that each byte of data has bits of data that are all received during the same period of the downstream clock signal DSCLK.

Master electronics card 112A further includes a clock receiver 222 that receives an upstream clock signal USCLK from the slave electronics cards 112B. The upstream clock signal USCLK is used to receive other upstream signals. In the present example, the data receivers 220 utilize the upstream clock signal USCLK to clock the incoming upstream data signals USD[7:0].

Further, bus circuit 112C of master electronics card 112A includes a grant engine 224 that identifies a slave electronics card 112B from a number of slave electronics cards 112B that is to receive control over the upstream bus during a subsequent framing period. Once identified, grant engine 224 outputs a bus grant signal USGNT that identifies the slave electronics card 112B to grant driver 216. As noted above, grant driver 216 drives the bus grant signal USGNT to the slave electronics cards 112B.

Figure 3A:
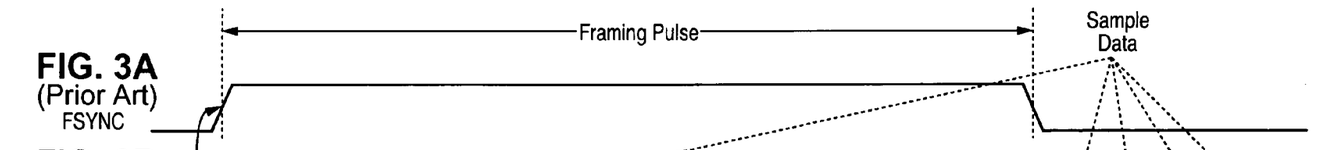
FIGS. 3A-3F are timing diagrams illustrating the operation of bus circuit 112C of master electronics card 112A.
Figure 3B:
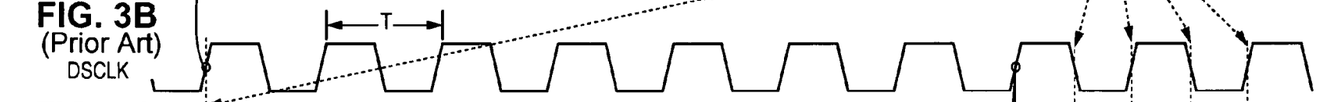
Figure 3C:
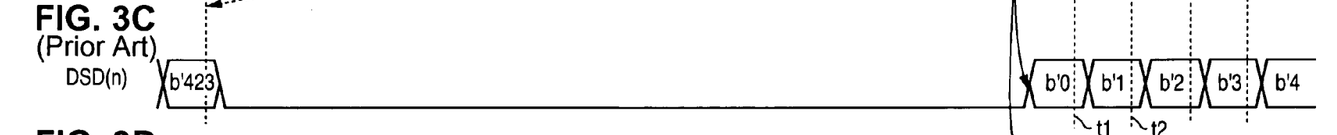
Figure 3D:
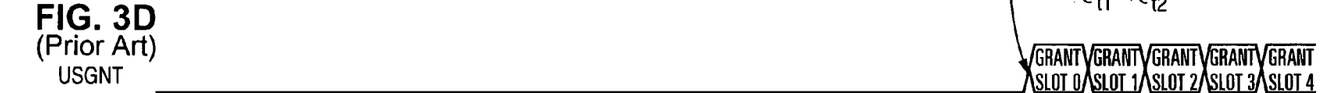
Figure 3E:
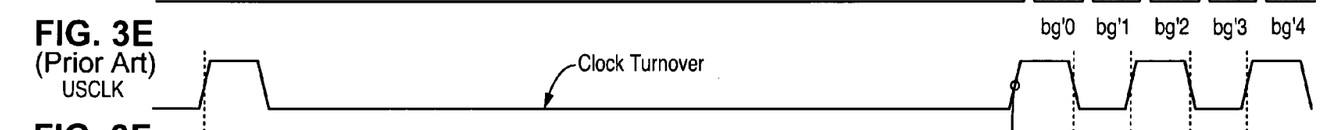
Figure 3F:
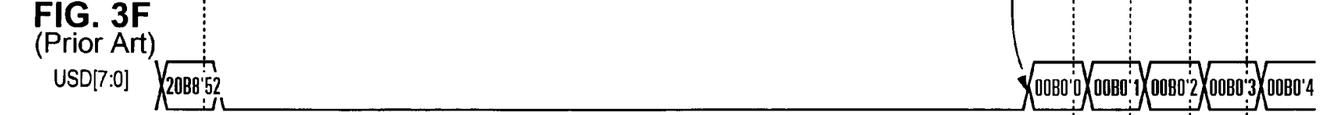
Figure 4A:
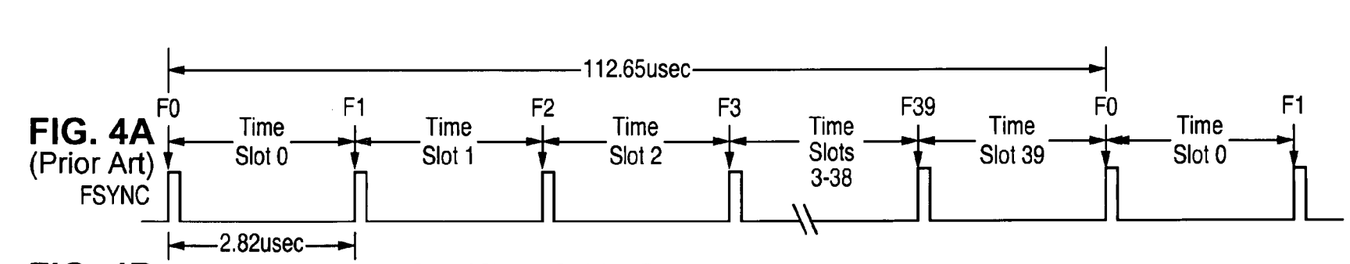
FIGS. 4A-4D are timing diagrams that further illustrate the operation of bus circuit 112C.
Figure 4B:
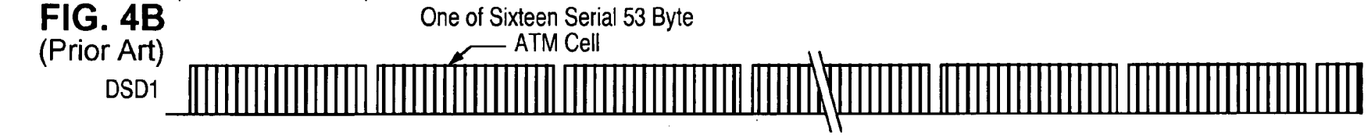
Figure 4C:
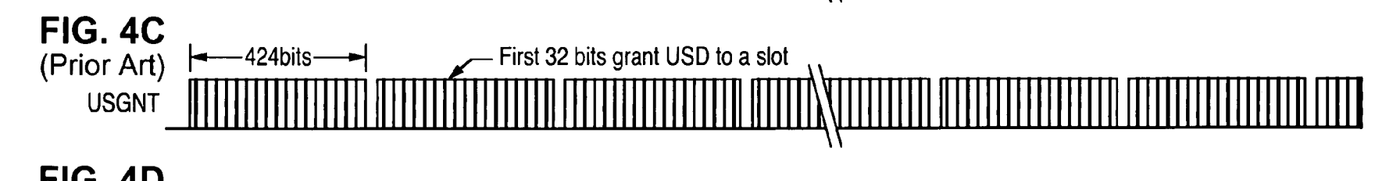
Figure 4D:
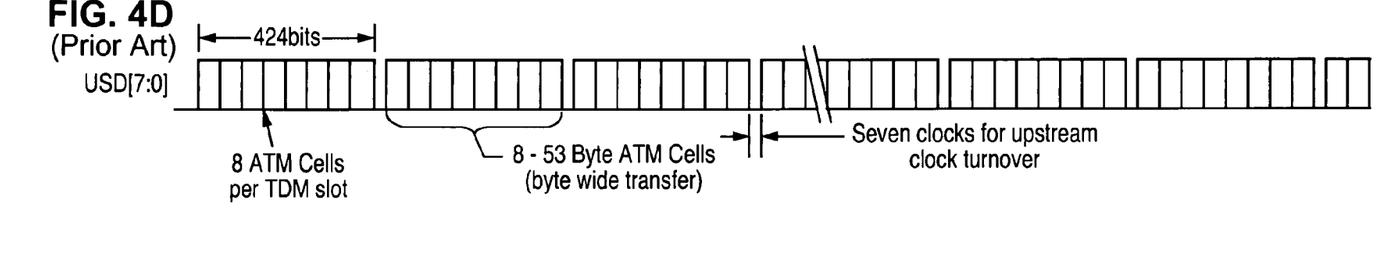

With respect to FIG. 3D, the bus grant signal USGNT generated by driver 216 includes 32 bits of grant data bg'0-bg'31 that are output following each falling edge of the framing pulse FSYNCH. Each bit of grant data, in turn, corresponds with a slave electronics card 112B. In addition, only one bit of the grant data has a logic high during each framing period.

Thus, when the first grant bit bg'0 corresponds with a first slave card 112B that has been configured to be identified as slot 0 on backplane 110, the first slave card 112B is granted control of the upstream bus by grant engine 224 for the next framing period by outputting the first grant bit bg'0 as a logic high and the remaining grant bits bg'1-bg'31 as logic lows during the current framing period.

Similarly, when the second grant bit bg'1 corresponds with a second slave card 112B that has been configured to be identified as slot 1 on backplane 110, the second slave card 112B is granted control of the upstream bus during the next framing period by outputting the first grant bit bg'0 as a logic low, the second grant bit bg'1 as a logic high, and the remaining grant bits bg'2-bg'31 as logic lows during the current framing period.

Returning to FIG. 2, master electronics card 112A also has a grant table 228 that is connected to grant engine 224. Table 1 illustrates an example of grant table 228.

TABLE 1

| Slot Number |
|---|
| 1 |
| 3 |
| 3 |
| ... |
| 2 |

Each row of Table 1 corresponds with a time slot. In the present example, Table 1 has 40 rows that correspond with 40 time slots. Each row/time slot, in turn, has an associated slot number that identifies a slave electronics card 112B on backplane 110. Thus, grant engine 224 reads from Table 1 and grants the upstream bus in cycles of forty time slots (framing periods), from time slot 0 to time slot 39 (see also FIG. 4A).

In the Table 1 example, the slave electronics card identified as slot 1 receives the first grant, the slave electronics card identified as slot 3 receives the $2^{nd}$ and $3^{rd}$ grants, and the slave electronics card identified as slot 2 receives the $40^{th}$ grant. During this forty-frame cycle, grant engine 224 can alternately grant the bus to a single slave forty times, zero times, or any number of times in between.

In operation, during time slot 0 (frame 0), grant engine 224 reads the associated slot number from the first row of grant table 228. Thus, in the present example, grant engine 224 reads during time slot 0 that the slave electronics card identified as slot 1 is to receive a frame. In response, grant engine 224 generates a bus grant signal USGNT that grants control over the upstream bus during a subsequent framing period to the slave electronics card 112B that is identified as slot 1.

During time slot 1 (frame 1), grant driver 216 drives the grant signal USGNT to the slave electronics card that is identified as slot 1. Further, grant engine 224 reads from the second row of grant table 228 that the slave electronics card identified as slot 3 is to receive a frame. In response, grant engine 224 generates a bus grant signal USGNT that grants control over the upstream bus to the slave electronics card 112B that is identified as slot 3.

During time slot 2 (frame 2), the slave electronics card that is identified as slot 1 transmits upstream data signals USD[7:0] over the upstream bus to the data receivers 220. Further, grant driver 216 drives the grant signal USGNT to the slave electronics card that is identified as slot 3.

In addition, grant engine 224 reads from the third row of grant table 228 that the slave electronics card that is identified as slot 3 is to again receive a frame. In response, grant engine 224 again generates a bus grant signal USGNT that grants control over the upstream bus to the slave electronics card 112B that is identified as slot 3.

During time slot 3 (frame 3), the slave electronics card that is identified as slot 3 transmits upstream data signals USD[7:0] over the upstream bus to the data receivers 220. Grant engine 224 continues to grant control over the upstream bus to the slave electronics card 112B that is associated with each succeeding time slot until grant engine 224 has stepped through each row in Table 1. After this, grant engine 224 returns to the top of Table 1 and again reads the slot number from the first row of grant table 228.

When a slave electronics card 112B receives a grant and takes control of the upstream bus, the slave electronics card 112B outputs ATM data cells to the data receivers 220 when data is present, and outputs ATM idle cells to the data receivers 220 when all of the data has been previously output and data is no longer present.

An idle cell can include, for example, all zeros. Further, an idle cell has a virtual path indicator (VPI) and a virtual connection indicator (VCI) that are both set to zero. As a result, an idle cell passes through an inverting BTL driver as a high logic level, which is the off state or low power state for an inverting BTL driver.

SUMMARY OF THE INVENTION

The present invention provides a master device of a communications system that includes a first driver that outputs a framing signal that has a plurality of framing periods, a second driver that outputs a grant signal, and a plurality of data receivers that receive a plurality of data signals during each framing period. The grant signal identifies a slave device that is to receive control over an upstream bus during a subsequent framing period.

The present invention also includes a method of operating a communications system that includes the step of outputting a framing signal that has a plurality of framing periods. The method also include the steps of reading a slot number from a memory, and outputting a grant signal to a slave device that corresponds with the slot number.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 5:
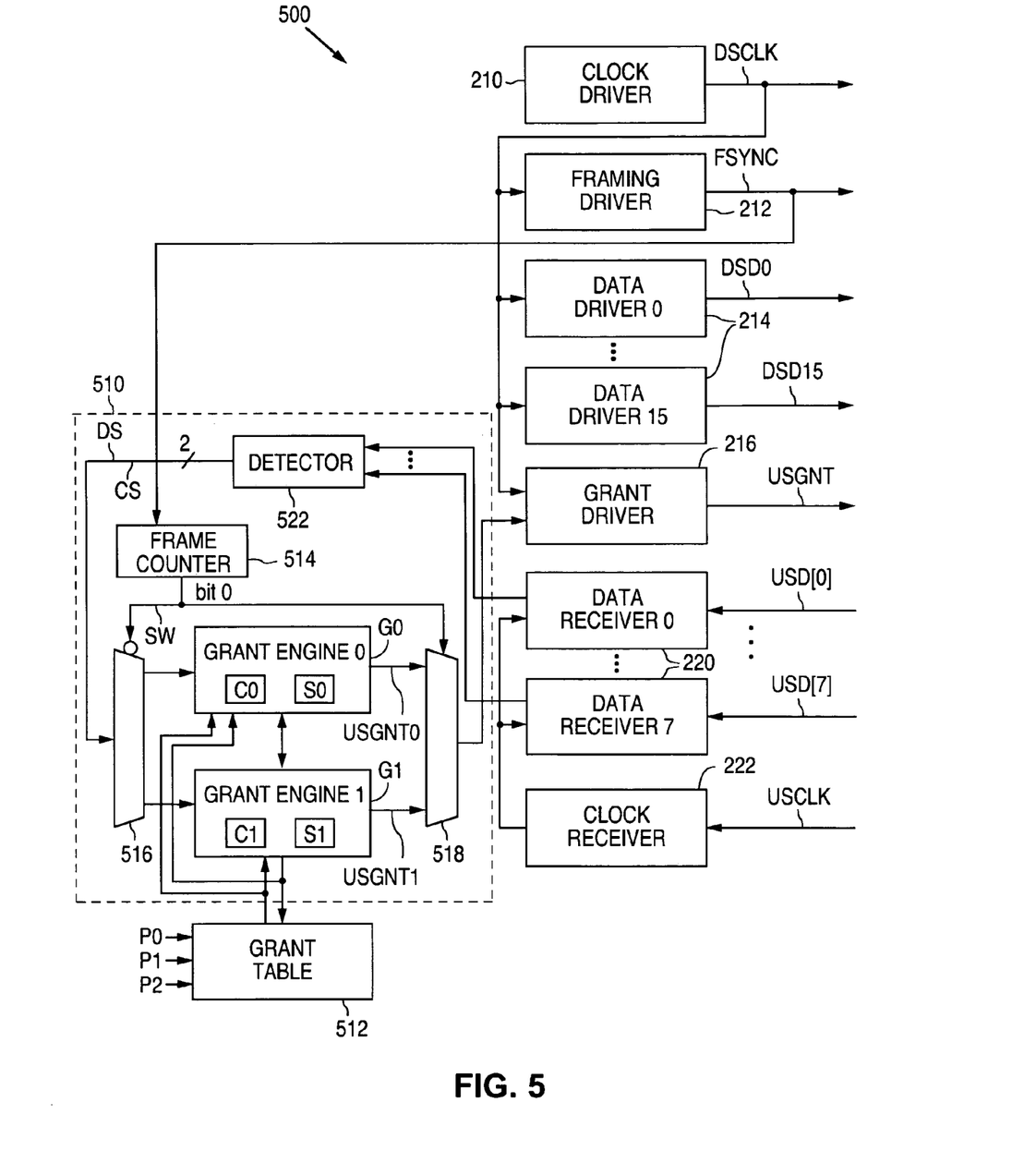
FIG. 5 is a block diagram illustrating an example of a bus circuit 500 of a master electronics card in accordance with the present invention.

FIG. 5 shows a block diagram that illustrates an example of a bus circuit 500 of a master electronics card in accordance with the present invention. As described in greater detail below, the bus circuit of the present invention adaptively grants the upstream bus to the slave electronics cards in a backplane-based communications system by the early termination of a scheduled number of grants to a slave electronics card when the bus circuit on the master electronics card detects idle cells.

In the present example, bus circuit 500 is similar to bus circuit 112C and, as a result, utilizes the same reference numerals to designate the structures that are common to both circuits. As shown in FIG. 5, bus circuit 500 differs from bus circuit 112C in that bus circuit 500 includes an adaptive bandwidth circuit 510 in lieu of grant engine 224, and a grant table 512 in lieu of grant table 228.

Adaptive bandwidth circuit 510, in turn, includes a system frame counter 514 that has an input connected to receive the framing signal FSYNC from framing driver 212, and an output. System frame counter 514 counts framing periods, and generates a value on the output that represents either an odd count, or a value that represent an even count, during each framing period.

In addition, adaptive bandwidth circuit 510 includes a first grant engine G0 that generates a bus grant signal USGNT0 during each even count. The bus grant signal USGNT0 identifies a slave electronics card that is to receive a bus grant during a next (odd) framing period of the frame synch signal FSYNC, and transmit data during a next (even) framing period of the frame synch signal FSYNC.

In addition, first grant engine G0 includes a first consecutive counter C0 that tracks the number of consecutive times that grant engine G0 has granted a slave electronics card 112B control of the upstream bus, and a first spare counter S0 that tracks the number of frames which were scheduled to be granted, but which were not granted, due to the detection of idle cells.

Adaptive bandwidth circuit 510 also includes a second substantially identical grant engine G1 that generates a bus grant signal USGNT1 during each odd count. The bus grant signal USGNT1 identifies a slave electronics card which is to receive a bus grant during a next (even) framing period of the frame synch signal FSYNC, and transmit data during a next (odd) framing period.

Further, second grant engine G1 includes a second consecutive counter C1 that tracks the number of consecutive times that grant engine G1 has granted a slave electronics card 112B control of the upstream bus, and a second spare counter S1 that tracks the number of frames which were scheduled to be granted, but which were not granted, due to the detection of idle cells. In the present invention, grant engines G0 and G1 are aware of the values held in each others spare counter S0 and S1.

As further shown in FIG. 5, adaptive bandwidth circuit 510 includes a switch 516 that is connected to the first and second grant engines G0 and G1, and to frame counter 514. Switch 516 passes an idle cell detected signal DS and a congestion marker detected signal CS to first grant engine G0 during even counts, and second grant engine G1 during odd counts.

Adaptive bandwidth circuit 510 further includes a switch 518 that is connected to grant engines G0 and G1, and to frame counter 514. Switch 518 passes the grant signal USGNT0 from first grant engine G0 to grant driver 216 during each even count. Grant driver 216 drives the grant signal received from grant engine G0 to the slave electronics cards during each odd count.

In addition, switch 518 passes the grant signal USGNT1 from second grant engine G1 to grant driver 216 during each odd count. Grant driver 216 drives the grant signal received from grant engine G1 to the slave electronics cards during each even count. (In the example shown, switch 516 has an inverting control input, while switch 518 has a non-inverting control input.)

In addition, adaptive bandwidth circuit 510 includes a detector circuit 522 that has an input connected to data receivers 220 to receive the data signals USD[7:0], and an output connected to the input of switch 516. (Although only one line is shown in FIG. 5, the one line represents a first line and a second line that separately carry the idle cell detected signal DS and the congestion marker detected signal CS, respectively.)

Grant table 512, in turn, is connected to the first and second grant engines G0 and G1 and, as shown in FIG. 5, includes a first engine pointer P0, a second engine pointer P1, and a next pointer P2. Table 2 illustrates an example of grant table 512.

TABLE 2

| Slot Number | Maximum # Frames | Burst Enable |
| --- | --- | --- |
| 2 | 1 | No |
| 1 | 10 | No |
| 3 | 4 | Yes |
| 5 | 2 | No |
| 4 | 20 | Yes |
| 0 | 25 | No |
| Unused Entry | | |
| ... | | |
| Unused Entry | | |

As shown, Table 2 includes a slot number column, a maximum number of frames column, and a burst enable column such that each listed slot number is either burst enabled or not.

In operation, framing driver 212 outputs the frame synch signal FSYNC, which has a plurality of framing periods, while system frame counter 514 counts the number of framing periods to indicate a value that has an even numbered count with a first logic state or an odd numbered count with a second logic state.

In frame 0 and the succeeding even numbered frames, system frame counter 514 outputs a switch signal SW with a logic state that allows the idle cell detected signal DS and the congestion marker detected signal CS to pass through switch 516 to grant engine G0, and the bus grant signal USGNT1 from grant engine G1 to pass through switch 518 to grant driver 216.

In frame 1 and the succeeding odd numbered frames, frame counter 514 changes the logic state of the signal to allow the idle cell detected signal DS and the congestion marker detected signal CS to pass through switch 516 to grant engine G1, and the grant signal USGNT0 from grant engine G0 to pass through switch 518 to grant driver 216.

During frame 0, grant engine G0 reads the slot number, the maximum number of frames, and whether or not the slot is burst enabled from the row of grant table 512 identified by the first engine pointer P0. Thus, in the present example, grant engine G0 reads from row 1 that the slave electronics card identified as slot 2 is to receive one frame.

In response, grant engine G0 generates a bus grant signal USGNT0 that grants the slave electronics card identified as slot 2 control over the upstream bus during the next even framing period. The grant to slot 2 is held in grant engine G0 until frame 1 arrives. In addition, grant engine G0 determines that the slave electronics card identified as slot 2 has received the maximum number of frames (one), and resets the consecutive counter C0.

Further, grant engine G0 sets the first engine pointer P0 to be equal to the next frame pointer P2 which, in the present example, is equal to row 3. Grant engine G0 also sets the next frame pointer P2 to the next populated row in grant table 512 which, in the present example, is row 4.

During frame 1, grant driver 216 receives the bus grant signal USGNT0 from grant engine G0 via switch 518, and drives the bus grant signal USGNT0 as the bus grant signal USGNT to the slave electronics cards. Further, grant engine G1 reads the slot number, the maximum number of frames, and whether or not the slot is burst enabled from the row of grant table 512 identified by second engine pointer P1. Thus, in the present example, grant engine G1 reads from row 2 that the slave electronics card identified as slot 1 is to receive ten frames.

In response, grant engine G1 generates a bus grant signal USGNT1 that grants the slave electronics card identified as slot 1 control over the upstream bus during the next odd framing period. The grant to slot 1 is held in grant engine G1 until frame 2 arrives. In addition, grant engine G1 adjusts the value held by the second engine consecutive counter C1 to indicate that a grant has been sent. For example, the maximum number of frames read from grant table 512 can be stored in the second engine consecutive counter C1, and the value can be decremented by one since one grant has been sent.

During frame 2, the slave electronics card that is identified as slot 2 transmits upstream data signals USD[7:0] over the upstream bus to the data receivers 220. Grant driver 216 also receives the bus grant signal USGNT1 from grant engine G1 via switch 518, and drives the bus grant signal USGNT1 as the bus grant signal USGNT to the slave electronics cards.

In addition, grant engine G0 reads the slot number, the maximum number of frames, and whether or not the slot is burst enabled from the row of grant table 512 identified by first engine pointer P0. Thus, in the present example, grant engine G0 reads from row 3 that the slave electronics card identified as slot 3 is to receive 4 frames.

In response, grant engine G0 generates a grant signal USGNT0 that grants the slave electronics card connected to slot 3 control over the upstream bus during the next even framing period. The grant to slot 3 is held in grant engine G0 until frame 3 arrives. In addition, grant engine G0 adjusts the value held by the first engine consecutive counter C0 to indicate that a grant has been sent. For example, the maximum number of frames read from grant table 512 can be stored in the first engine consecutive counter C0, and the value can be decremented by one since one grant has been sent.

During frame 3, the slave electronics card identified as slot 1 transmits the upstream data signals USD[7:0] to the data receivers 220. Grant driver 216 also receives the bus grant signal USGNT0 from grant engine G0 via switch 518, and drives the bus grant signal USGNT0 as the bus grant signal USGNT to the slave electronics cards.

Further, since grant engine G1 has only transmitted one of the 10 frames allotted to the slave electronics card identified as slot 1, grant engine G1 again generates a grant signal USGNT1 that grants the slave electronics card identified as slot 1 control over the upstream bus during the next odd framing period.

In addition, grant engine G1 again adjusts the value held by the second engine consecutive counter C1 to indicate that another grant has been generated. For example, the value stored in the second engine consecutive counter C1 can be again decremented by one to a value of eight since another grant has been sent.

During frame 4, the slave electronics card identified as slot 3 transmits upstream data signals USD[7:0] over the upstream bus to the data receivers 220. As long as a slave electronics card has data to send, the process continues as above with each grant engine G0 and G1 counting a number of consecutive grants that have been output to a slave electronics card that corresponds with a slot number, and outputting a grant signal to the slave electronics card during each alternating count until the number of consecutive grant signals indicates that the maximum number of grants have been received.

Once the number of consecutive grant signals indicates that the maximum number of grants listed in grant table 512 have been received, the grant engine moves to the next row in grant table 512 that is identified by the pointer to grant control of the upstream bus to another slave electronics card.

Further, in accordance with the present invention, detector 522 evaluates the upstream data signals USD[7:0] received by receivers 220 to detect any idle cells within a frame and, when detected, generates the idle cell detected signal DS to indicate that an idle cell was detected within the frame.

When the grant engine receives the idle cell detected signal DS, the grant engine responds as though the slave electronics circuit has received the maximum number of grants allowed by grant table 512, even though fewer than all of the grants have been received. Specifically, the grant engine suspends the remaining grants the slave electronics card connected to the slot was scheduled to receive, and increases the value held in the spare counter by the number of remaining grants.

For example, if detector circuit 522 detects an idle cell during frame 3 when the slave electronics card identified as slot 1 is transmitting, detector circuit 522 generates the idle cell detected signal DS to indicate that an idle cell has been detected. Grant engine G1 responds by determining whether the number of consecutive grants equals the maximum number of grants and, when the values are unequal, determining a difference value.

In addition, grant engine G1 increases the value held in the second spare counter S1 by the difference value, nine in this example since idle cells were detected during the framing period before the second of the ten grants was output. Thus, nine of the ten grants were spared.

After increasing the value in the spare counter, the grant engine sets the consecutive counter to a value that indicates that the maximum number of grants have been received. For example, after grant engine G1 increases the value held in the second spare counter S1 by nine, grant engine G1 sets the second consecutive counter C1 to zero, thereby indicating that the maximum number of frames has been granted.

Further, the grant engine also sets the engine pointer to be equal to the next pointer, and sets the next pointer to identify the next populated row in the table. For example, grant engine G1 sets the second engine pointer P1 to be equal to the next pointer P2 which, in the present example, is equal to row 4 (pointer P0 points to row 3 in this example). Further, grant engine G1 sets the next pointer P2 to identify the next populated row in the table which, in the present example, is row 5.

Thus, in accordance with the present invention, as soon as a grant engine receives an idle cell detected signal DS that indicates that an idle cell was detected, the grant engine stops granting the bus to the current slave electronics card, even though the slave electronics card is scheduled to receive more grants, and moves on to grant the bus to another slave electronics card. As a result, the utilization efficiency of the upstream bus is substantially increased.

Thus, unlike the prior art, where a slave electronics card can continue to receive bus grants even though there is no more data to send, the present invention allows other slave electronics cards to receive bus grants when the slave electronics card scheduled to receive the next grant has no more data to send, as indicated by the presence of idle cells.

Due to conditions in a communication path, a slave electronics card, which has a relatively low average traffic throughput, may receive a burst of ATM cells in a short period of time. If the throughput of the slave electronics card is assigned a relatively low level, the data buffer in that slave electronics card may become full and drop cells.

In additional accordance with the present invention, when the data in a data buffer in a slave electronics card exceeds a watermark level, the slave electronics card can place a congestion marker in the header of each ATM cell sent. The watermark level, in turn, indicates that the data buffer has exceeded a threshold level and that cells are in danger of being dropped. The slave electronics card also removes the congestion marker when the data in the data buffer falls below the watermark level.

In the present invention, detector circuit 522 also determines whether the data signals USD[7:0] includes a congestion marker. When detected, detector circuit 522 generates the congestion marker detected signal CS which passes through multiplexer 516 to indicate to a grant engine that the congestion marker was detected.

If the grant engine determines that the current slave electronics card has additional grants to receive (only two of ten scheduled grants have been generated), the grant engine ignores the congestion marker detected signal CS. On the other hand, if the grant engine determines that the current slave electronics card is being granted its last scheduled bus grant signal, the grant engine outputs an additional bus grant signal to the slave electronics card. The additional bus grant signal follows the last scheduled bus grant signal when the congestion marker is detected, burst mode is enabled, and a spare counter has a positive non-zero value that indicates that extra frames are available.

Thus, if burst mode for the slave electronics card is enabled in grant table 512, and if extra grants are available as measured by the first or the second spare counters S0 and S1, then the grant engine sends additional bus grant signals to the slave electronics card when the congestion marker is detected. The additional bus grant signals continue until both spare counters are zero, the congestion marker has been removed (as a result of the data falling below the watermark level in the buffer), or idle cells are detected.

Once an additional bus grant signal has been sent, the grant engine reduces the value of a spare counter by one. The grant engine first seeks to reduce the value of its own spare counter, and only reduces the value of the spare counter of the other grant engine if its own spare counter is equal to zero.

For example, assume that the slave electronics card identified as slot 3 receives a burst of data and places a congestion marker in the header of a cell in the second frame of data. Since the slave electronics card identified as slot 3 is to receive two more grants, the grant engine ignores the congestion marker detected signal DS generated by detector 522.

On the other hand, since the burst mode for the slave electronics card is enabled in grant table 512, and the second spare counter S1 indicates that nine spare grants are available, when grant engine G0 detects the congestion marker after the fourth grant has been issued to the slave electronics card identified as slot 3, grant engine G0 sends additional bus grant signals to the slave electronics card identified as slot 3 until both spare counters are zero, the congestion marker has been removed, or idle cells are detected.

Further, each time an additional bus grant signal is generated, grant engine G0 first attempts to reduce the value of the first spare counter S0. In the present example, the value of the first spare counter S0 is equal to zero, while the value of the second spare counter S1 is equal to nine. Thus, since the first spare counter S0 is equal to zero, first grant engine G0 decrements the value held by the second spare counter S1 by one.

Each of the spare counters S0 and S1 is reset to zero when the grant engine's table pointer (P0 or P1) passes the end of grant table 512. For example, when the table pointer P0 passes the end of grant table 512, grant engine G0 resets the value held by spare counter S0 to zero.

Thus, by enabling burst mode, a slave electronics circuit can request and obtain additional grants to accommodate burst conditions if any spare grants have been obtained by the early termination of a number of grants that were scheduled to be given to other slave electronics cards.

The following pseudo code further describes an example of the operation of one grant engine.

```
serve_cnt = 0;      //the value of the consecutive counter.
idle_det = false;   //true if an idle cell is detected.
pt_det = false;     //true if a congestion-marked cell is detected.
cur_slot = Null;    //the current slot number.
```

-continued

```
spare_cnt = 0;        //the value held by the spare counter.
1.   forever {
2.       wait for start of frame;
3.       if (serve_cnt>0 and idle_det == false), send_grant(cur_slot);
```

//line 3, if all of the frames scheduled to be granted to a slave electronics card have yet to be granted and no idle cell has been detected, send the bus grant signal USGNT to the slave electronics card in the slot currently controlling the upstream bus.

```
4.   else if (serve_cnt==0 and idle_det==false && pt_det ==true &&
5.       burst_enable==true &&
6.       (spare_cnt>0 or other_engine_spare_cnt>0)) {
7.           send_grant(cur_slot);
8.           if (spare_cnt>0), then spare_cnt = spare_cnt-1
9.           else other_engine_spare_cnt =
10.              other_engine_spare_cnt-1;
11.  }
```

//lines 4–11, if all of the frames scheduled to be granted to a slave electronics card have been granted, no idle cell has been detected, a congestion condition has been detected, burst enable has been enabled, and the value held by either of the spare counter of the two grant engines G0 or G1 is greater than zero, send the bus grant signal USGNT to the slave electronics card in the slot currently controlling the upstream bus, and decrement the value of one of the spare counters.

```
12.  else {
13.      if (next_pointer<= pointer), spare_cnt = 0; //pointer across 0
```

//line 13, if the next pointer is less than the current pointer for the grant engine, then the end of the grant table has been reached and the spare counter is reset to zero.
14. else spare_cnt=spare_cnt+serve_cnt;
//line 14, if an idle cell is detected, set the spare count to be equal to the spare count plus the consecutive count.

```
15.      pointer = next_pointer
16.      next_pointer = get_next_pointer(next_pointer);
17.      serve_cnt = pointer[max_frame];
18.      cur_slot = pointer[slot_num];
19.      send_grant(cur_slot);
20.  }
```

//lines 15–20, set a new value for the current slot, set the serving counter to the maximum number of frames that can be granted to the current slot, and send the bus grant signal USGNT to the slave electronics card in the current slot.
21. serve_cnt=serve_cnt-1;
//reduce the serving count by one when the bus grant signal USGNT is generated.

```
22.      wait for start of frame;
23.      idle_det = false;
24.      for (i=0; i<8; i=i+1) if (idle_cell_detected) idle_det = true;
25.      pt_det = false;
```

```
26.      for (i=0; i<8; i=i+1) if (congestion marked cell is detected)
27.          pt_det = true;
28.  }
```

//at the start of a frame, set the idle cell detect and congestion detect to false, but set to true if detected in the next eight cells.

```
29.      get_next_pointer(next_pointer)
30.      {    new = next_pointer + 1;
31.           if (new==gnum), new = 0;
32.           return(new);
33.      }
```

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A communications system having a master device and one or more slave devices, the master device including:
   a first driver that outputs a framing signal that has a series of framing periods;
   a second driver that outputs a grant signal, the grant signal identifying a slave device that is to receive control over an upstream bus during a subsequent framing period;
   a number of data receivers that receive a plurality of data signals during each framing period from the upstream bus;
   a frame counter that counts framing periods, and generates a value that represents either an odd count, or a value that represents an even count, during each framing period;
   a first grant engine that generates a bus grant signal during each even count that identifies a slave device which is to receive a bus grant during a subsequent framing period of the framing signal; and
   a second grant engine that generates a bus grant signal during each odd count that identifies a slave device which is to receive a bus grant during a subsequent framing period of the framing signal.

2. The communications system of claim 1 and further comprising an output switch connected to the frame counter, the first grant engine, the second grant engine, and the second driver, the output switch passing a bus grant signal generated by the first grant engine to the second driver, or a bus grant signal generated by the second grant engine to the second driver, depending on the value of the frame counter.

3. The communications system of claim 2 wherein the master device further includes a grant table connected to the first and second grant engines, the grant table having a first column that lists the one or more slave devices, a second column that lists a maximum number of grants for each of the one or more slave devices, and a third column that lists a burst enabled state for each of the one or more slave devices.

4. The communications system of claim 1 and further comprising:

a detector connected to the number of data receivers, the detector generating an idle cell detected signal when an idle cell is detected in a frame; and an input switch connected to the first and second grant engines, the frame counter, and the detector, the input switch passing the idle cell detected signal to the first grant engine or the second grant engine, depending on the value of the frame counter.

5. The communications system of claim 4 wherein the first grant engine further includes a first consecutive counter that counts a number of consecutive times that a slave device has been granted control of the upstream bus.

6. The communications system of claim 5 wherein the first grant engine sets a value held by the first consecutive counter to be equal to the maximum number of grants for a slave device.

7. The communications system of claim 6 wherein the first grant engine decrements the value of the first consecutive counter each time a grant is generated.

8. The communications system of claim 7 wherein the first grant engine further includes a spare counter that counts a number of spares.

9. The communications system of claim 8 wherein the first grant engine increases a value of the spare counter by a value held by the first consecutive counter when the idle cell detected signal is received.

10. The communications system of claim 9 wherein the first grant engine sets a value of the first consecutive counter to a value that indicates that the maximum number of grants has been generated after the value of the spare counter has been increased.

11. The communications system of claim 10 wherein the detector also detects a congestion condition, and notifies a grant engine when the congestion condition is detected.

12. The communications system of claim 11 wherein the first grant engine generates additional grants to a slave device when burst enabled, the congested condition is detected, a last scheduled grant has been output, and the spare counter of a grant engine indicates that spares are available.

13. A method of operating a communications system comprising:

outputting a framing signal that has a series of framing periods;

reading a slot number from a memory;

outputting a grant signal to a slave device that corresponds with the slot number during a framing period;

counting the framing periods to indicate an even numbered count or an odd numbered count;

reading a maximum number of grants from the memory when the slot number is read;

counting a number of consecutive grant signals that have been output to the slave device that corresponds with the slot number;

receiving a plurality of data signals during a framing period;

determining whether the plurality of data signals includes an idle cell;

when an idle cell is detected:

determining whether the number of consecutive grant signals equals the maximum number of grants;

determining a difference value if the number of consecutive grant signals is less than the maximum number of grants;

increasing a value of a spare count by the difference value; and setting the number of consecutive grant signals to a value that indicates that the maximum number of grants have been received after the value of the spare count has been increased.

14. The method of claim 13 and further comprising:

storing the maximum number of grants as a value in a consecutive counter; and decrementing the value in the consecutive counter each time a grant signal is output.

15. The method of claim 14 wherein the value held by the consecutive counter is set to zero to indicate that the maximum number of grants have been received.

16. The method of claim 13 and further comprising:

reading a burst enable value from the memory when the slot number and the maximum number of grants is read; and determining whether the plurality of data signals includes a congestion marker.

17. The method of claim 16 and further comprising:

outputting an additional grant signal to the slave device that corresponds with the slot number following a last scheduled grant signal when the congestion marker is detected, burst mode is enabled, and the spare counter has a positive non-zero value; and decrementing the value of the spare counter each time an additional grant signal is output.

18. An adaptive bandwidth circuit comprising:

a counter to generate a count value;

a first grant engine to generate a first bus grant signal that identifies a device to receive a bus grant each time the count value is even, the first grant engine includes:

a grant register to list a number of consecutive bus grant signals that remain to be output to a device, the first grant engine setting the grant register to indicate that no more bus grant signals remain to be sent when the status signal is received and the number of consecutive bus grant signals is greater than zero; and a spare register to list a number of spare bus grant signals, the first grant engine adding the number of consecutive bus grant signals that remain to be output to a device to the number of spare bus grant signals in the spare register when the status signal is received and the number of consecutive bus grant signals is greater than zero;

a second grant engine to generate a second bus grant signal that identifies a device to receive a bus grant each time the count value is odd;

a switch connected to the counter, the first grant engine, and the second grant engine, the switch passing a status signal to the first grant engine and the second grant engine at different times, the switch passing the status signal to the first grant engine when the count value is even, and the second grant engine when the count value is odd; and a detector connected to the switch, the detector to determine whether an idle indicator is present during each of a number of receive periods, and generate the status signal each time the idle indicator is present during a receive period, the idle indicator indicating that there is no more data to be received during the receive period.

19. The adaptive bandwidth circuit of claim 18 wherein:

the detector to determine whether a congestion indicator is present during each of the number of receive periods, and generate a congestion signal each time the congestion indicator is present during a receive period, the congestion indicator indicating that there is more data to be transmitted;

the switch passes the congestion signal to the first grant engine when the count value is even, and the second grant engine when the count value is odd;

the first grant engine generates an additional bus grant signal when the congestion signal is received, the number of consecutive bus grant signals indicates that a last bus grant signal is to be output, and the number of spare bus grant signals is greater than zero.

20. A method of operating a communications system comprising:

reading an identifier that identifies a first device, and a first value that represents a number of consecutive bus grants that are to be output to the first device, each bus grant to grant the first device control over a bus for a period of time;

storing the first value as a stored number;

generating a first bus grant signal for the first device;

reducing the stored number by a value that represents one bus grant in response to generating the first bus grant signal;

generating a second bus grant signal for the first device after the first bus grant signal has been generated when the stored number is greater than zero;

reducing the stored number by a value that represents one bus grant in response to generating the second bus grant signal;

determining whether an idle indicator has been received;

after the first bus grant signal has been generated, if the stored number is greater than zero when the idle indicator is received, setting the stored number to zero;

setting a spare number to zero;

storing the spare number; and after the first bus grant signal has been generated, if the stored number is greater than zero when the idle indicator is received, adding the stored number to the spare number.

21. The method of claim 20 and further comprising:

determining whether a congestion indicator has been received;

after the first bus grant signal has been generated, if the stored number is equal to zero and the spare number is greater than zero, incrementing the stored number by a value that represents one bus grant and decrementing the spare number by a value that represents one bus grant when the congestion indicator is received; and after the first bus grant signal has been generated, if the stored number is greater than zero, ignoring the congestion indicator when the congestion indicator is received.

22. The method of claim 20 and further comprising:

after the first bus grant signal has been generated, reading an identifier that identifies a second device, and a second value that represents a number of consecutive bus grants that are to be output to the second device when the stored number is equal to zero; and storing the second value as the stored number.

23. The method of claim 20 wherein reception of the idle indicator is determined before the second bus grant signal is generated.

* * * * *